(12) United States Patent
Lee et al.

(10) Patent No.: US 10,811,910 B2
(45) Date of Patent: *Oct. 20, 2020

(54) METHOD AND APPARATUS FOR PROTECTING WIRELESS POWER RECEIVER FROM EXCESSIVE CHARGING TEMPERATURE

(71) Applicant: Samsung Electronics Co., Ltd., Gyeonggi-do (KR)

(72) Inventors: Woo-Ram Lee, Gyeonggi-do (KR); Yu-Su Kim, Gyeonggi-do (KR); Se-Ho Park, Gyeonggi-do (KR); Seung-Woo Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,750

(22) Filed: Apr. 11, 2019

(65) Prior Publication Data

US 2019/0238003 A1    Aug. 1, 2019

Related U.S. Application Data

(63) Continuation of application No. 15/880,080, filed on Jan. 25, 2018, now Pat. No. 10,541,564, which is a
(Continued)

(30) Foreign Application Priority Data

Dec. 6, 2012    (KR) ........................ 10-2012-0141308
Nov. 20, 2013    (KR) ........................ 10-2013-0141403

(51) Int. Cl.
*H02J 7/00*        (2006.01)
*H02J 50/12*      (2016.01)
(Continued)

(52) U.S. Cl.
CPC ............ *H02J 50/12* (2016.02); *H02J 7/0029* (2013.01); *H02J 7/0091* (2013.01);
(Continued)

(58) Field of Classification Search
CPC ........... H02J 5/005; H02J 7/025; H02J 50/00–50/90; H02J 7/35; H02J 7/02; H02J 17/00; H04B 5/00
See application file for complete search history.

(56) References Cited

U.S. PATENT DOCUMENTS 6,819,226 B2    11/2004    Randall
8,315,746 B2    11/2012    Cox
(Continued)

FOREIGN PATENT DOCUMENTS

KR    1020060107147    10/2006
KR    1020070014381    2/2007
(Continued)

OTHER PUBLICATIONS

U.S. Office Action dated Jul. 10, 2019 issued in counterpart application U.S. Appl. No. 16/381,459, 11 pages.
(Continued)

*Primary Examiner* — Arun C Williams
(74) *Attorney, Agent, or Firm* — The Farrell Law Firm, P.C.

(57) ABSTRACT

An apparatus and a method for are provided for a wireless power receiver. The method includes receiving power from a wireless power transmitter; converting the power in an alternating current (AC) form into a direct current (DC) form and providing the converted power to a battery of the electronic device; measuring a temperature of a point in the wireless power receiver during reception of the wireless power; maintaining an amount of the converted power at a first level if the temperature is lower than a preset tempera-
(Continued)

ture; decreasing the amount of the converted power to a second level which is lower than the first level if the amount of the converted power is at the first level and the temperature is higher than or equal to the preset temperature; increasing the amount of the converted power to the first level if the amount of the converted power is at the second level and the temperature is lower than the preset temperature; and transmitting, to the wireless power transmitter, a signal including status information of the wireless power receiver device and control information to control the wireless power transmitter.

13 Claims, 7 Drawing Sheets

Related U.S. Application Data continuation of application No. 15/250,051, filed on Aug. 29, 2016, now Pat. No. 9,899,865, which is a continuation of application No. 14/099,228, filed on Dec. 6, 2013, now Pat. No. 9,431,848.

(51) Int. Cl.
  *H02J 50/40* (2016.01)
  *H02J 50/80* (2016.01)
  *H02J 50/10* (2016.01)
  *H02J 7/02* (2016.01)

(52) U.S. Cl.
  CPC .... *H02J 7/00309* (2020.01); *H02J 7/007192* (2020.01); *H02J 7/027* (2013.01); *H02J 50/10* (2016.02); *H02J 50/40* (2016.02); *H02J 50/80* (2016.02); *H02J 7/0003* (2013.01); *H02J 7/00032* (2020.01)

(56) References Cited

U.S. PATENT DOCUMENTS

| | | | |
|---|---|---|---|
| 8,854,216 | B2 | 10/2014 | Uchida |
| 2002/0167295 | A1 | 11/2002 | Yamasgita |
| 2003/0107347 | A1 | 6/2003 | Yoshizawa et al. |
| 2003/0117143 | A1 | 6/2003 | Okada |
| 2008/0030171 | A1 | 2/2008 | Villefrance et al. |
| 2010/0277128 | A1* | 11/2010 | Tam .................. G06F 1/203 320/150 |
| 2011/0050164 | A1 | 3/2011 | Partovi et al. |
| 2012/0223590 | A1 | 9/2012 | Low et al. |
| 2012/0242285 | A1 | 9/2012 | Jung et al. |
| 2013/0278226 | A1 | 10/2013 | Cong |
| 2014/0084856 | A1 | 3/2014 | Howard et al. |
| 2014/0253026 | A1* | 9/2014 | Du .................. H02J 50/80 320/108 |

FOREIGN PATENT DOCUMENTS

| | | |
|---|---|---|
| KR | 1020120108340 | 10/2012 |
| KR | 1020200034466 | 3/2020 |

OTHER PUBLICATIONS

U.S. Office Action dated Apr. 4, 2019 issued in U.S. Appl. No. 15/880,080, 11 pages.

KR Decision of Grant dated Jun. 11, 2020 issued in counterpart application No. 10-2013-0141403, 7 pages.

* cited by examiner

METHOD AND APPARATUS FOR PROTECTING WIRELESS POWER RECEIVER FROM EXCESSIVE CHARGING TEMPERATURE

PRIORITY

This application is a Continuation of U.S. Ser. No. 15/880,080, which was filed in in the U.S. Patent and Trademark Office (USPTO) on Jan. 25, 2018, which is a Continuation of U.S. Ser. No. 15/250,051, which was filed in in the USPTO on Aug. 29, 2016, issued as U.S. Pat. No. 9,899,865 on Feb. 20, 2018, which is a Continuation of U.S. Ser. No. 14/099,228, which was filed in in the USPTO on Dec. 6, 2013, issued as U.S. Pat. No. 9,431,848 on Aug. 30, 2016, and claims priority under 35 U.S.C. § 119(a) to Korean Patent Application Serial Nos. 10-2012-0141308 and 10-2013-0141403, which were filed in the Korean Intellectual Property Office on Dec. 6, 2012 and Nov. 20, 2013, respectively, the entire disclosure of each of which is incorporated herein by reference.

BACKGROUND OF THE INVENTION

1. Field of the Invention

The present invention relates generally to a method and an apparatus for protecting a wireless power receiver from excessive temperature caused by charging.

2. Description of the Related Art

Mobile terminals, such as cell phones, Personal Digital Assistants (PDAs), and the like are powered by rechargeable batteries, and they need separate charging devices to recharge the batteries. Typically, the charging device and the battery are electrically connected by contacting their contact terminals together.

However, such contact terminals are easily contaminated by dirt because they are exposed to the air, and thus battery charging may not be performed correctly. Also, when the contact terminals are exposed to moisture, charging may likely go wrong.

To solve this problem, wireless charging or contactless charging technologies have recently been developed and applied to various electronic devices.

The wireless charging technology uses wireless power transmission and reception, which enables, for example, a battery of a cell phone to be automatically charged just by placing the cell phone on a charging pad without a need of a separate charging connector. This technology is known in a form of wireless electric toothbrushes or wireless electric shaver. The wireless charging technology enhances waterproof performance and portability of the electronic device by charging them wirelessly without a need of a cable charger, and in the field of electric vehicles, relevant technologies are expected to be significantly developed.

In a wireless power receiver, rectifying alternate current power to direct current power and regulating the direct current power to a certain level may possibly create heat. The wireless power receiver monitors its temperature and stops receiving wireless power if the temperature rises above a predetermined threshold. Thus, the wireless power receiver may stop wireless charging due to a temperature rise and resume it when the temperature drops. Considering the importance of seamless wireless charging, the wireless power receiver may not perform such seamless wireless charging once it stops charging due to a high temperature until the temperature drops. To resume charging, it has to be connected to a wireless power transmitter again and the user has to wait until the connection is made, which may cause great inconvenience to the user.

SUMMARY OF THE INVENTION

The present invention has been made to address at least the problems and disadvantages described above, and to provide at least the advantages described below.

Accordingly, an aspect of the present invention is to provide an apparatus and a method for protecting a wireless power receiver from excessive temperature in order to keep the wireless power receiver performing seamless charging.

Another aspect of the present invention is to provide an apparatus and a method for preventing temperature rise in a wireless power receiver by decreasing the current as the temperature rises above a preset temperature.

In accordance with an aspect of the present invention, an electronic device including a wireless power receiver is provided. The electronic device includes a power receiving circuitry configured to wirelessly receive power from a wireless power transmitter; a power converting circuitry configured to convert the received power in an alternating current (AC) form into a direct current (DC) form; a power management circuitry configured to provide the converted power to a battery of the electronic device; a temperature measurement unit configured to measure a temperature of a point in the electronic device; a communication unit; and a controller configured to control the power management circuitry to maintain an amount of the converted power at a first level if the temperature measured by the temperature measurement unit is lower than a preset temperature, control the power management circuitry to decrease the amount of the converted power to a second level which is lower than the first level if the amount of the converted power is at the first level and the temperature measured by the temperature measurement unit is higher than or equal to the preset temperature, and control the power management circuitry to increase the amount of the converted power to the first level if the amount of the converted power is at the second level and the temperature measured by the temperature measurement unit is lower than the preset temperature, wherein the controller is further configured to control the communication unit to transmit, to the wireless power transmitter, a signal including status information of the electronic device and control information to control the wireless power transmitter.

In accordance with another aspect of the present invention, a method is provided for a wireless power receiver. The method includes receiving power from a wireless power transmitter; converting the power in an alternating current (AC) form into a direct current (DC) form and providing the converted power to a battery of the electronic device; measuring a temperature of a point in the wireless power receiver during reception of the wireless power; maintaining an amount of the converted power at a first level if the temperature is lower than a preset temperature; decreasing the amount of the converted power to a second level which is lower than the first level if the amount of the converted power is at the first level and the temperature is higher than or equal to the preset temperature; increasing the amount of the converted power to the first level if the amount of the converted power is at the second level and the temperature is lower than the preset temperature; and transmitting, to the wireless power transmitter, a signal including status information of the wireless power receiver device and control information to control the wireless power transmitter.

BRIEF DESCRIPTION OF THE DRAWINGS

The above and other aspects, features, and advantages of the present invention will become more apparent from the following detailed description taken in conjunction with the accompanying drawings in which.

Throughout the drawings, like reference numerals will be understood to refer to like parts, components, and structures.

DETAILED DESCRIPTION OF EMBODIMENTS OF THE PRESENT INVENTION

Various embodiments of the present invention will be described in detail hereinafter with reference to the accompanying drawings. This invention may, however, be embodied in many different forms and should not be construed as limited to the embodiments of the present invention set forth herein; rather, these embodiments of the present invention are provided so that this invention will be thorough and complete, and will be understood by those skilled in the art without departing from the scope of the invention. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the present invention. Descriptions shall be understood as to include any and all combinations of one or more of the associated listed items when the items are described by using the conjunctive term "~ and/or ~," or the like.

The terminology used herein is for the purpose of describing particular embodiments of the present invention only and is not intended to limit the invention. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meanings in the context of the relevant art and will not be interpreted in an idealized or overly formal sense unless expressly so defined herein.

Figure 1:
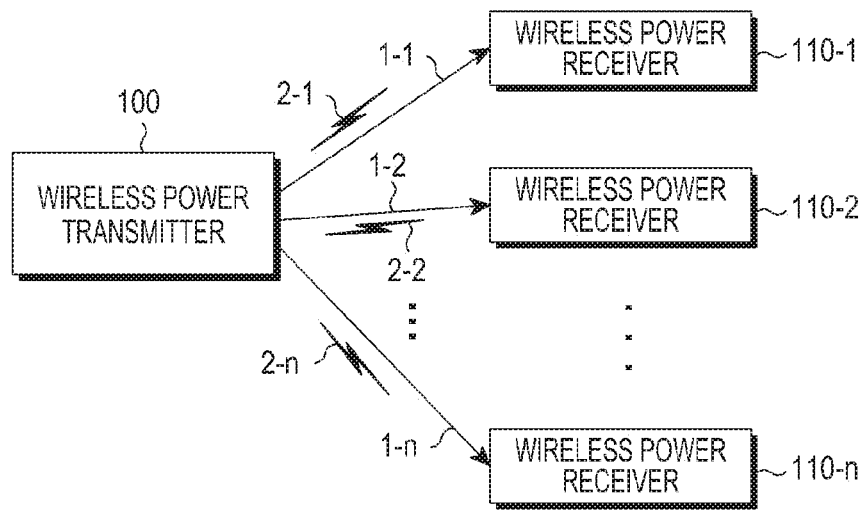
FIG. 1 illustrates a wireless charging system according to an embodiment of the present invention.

FIG. 1 illustrates a wireless charging system according to an embodiment of the present invention. Referring to FIG. 1, the wireless charging system includes a wireless power transmitter 100 and at least one wireless power receiver 110-1, 110-2, . . . , 110-$n$.

The wireless power transmitter 100 may wirelessly transmit respective power 1-1, 1-2, . . . , 1-$n$ to the at least one wireless power receiver 110-1, 110-2, . . . , 110-$n$. The wireless power transmitter 100 may wirelessly transmit power 1-1, 1-2, . . . , 1-$n$ to any of the wireless power receivers 110-1, 110-2, . . . , 110-$n$, which is authenticated in a predetermined authentication procedure.

The wireless power transmitter 100 may make electrical connection with at least one of the wireless power receivers 110-1, 110-2, . . . , 110-$n$. For example, the wireless power transmitter 100 may transmit wireless power to the at least one of the wireless power receivers 110-1, 110-2, . . . , 110-$n$ through electromagnetic waves.

The wireless power transmitter 100 may also perform two way communication with the at least one of the wireless power receiver 110-1, 110-2, . . . , 110-$n$. The wireless power transmitter 100 and the wireless power receivers 110-1, 110-2, . . . , 110-$n$ may handle or communicate packets 2-1, 2-2, . . . , 2-$n$ of certain frames, which will be described later in detail. The wireless power receiver may be implemented particularly as a mobile communication terminal, a Personal Digital Assistant (PDA), a Portable Multimedia Player (PMP), a smartphone, etc.

The wireless power transmitter 100 may provide wireless power to a plurality of the wireless power receivers 110-1, 110-2, . . . , 110-$n$. For example, the wireless power transmitter 100 may transmit wireless power to the plurality of the wireless power receivers 110-1, 110-2, . . . , 110-$n$ in a resonance method. If the resonance method is adopted by the wireless power transmitter 100, a distance between the wireless power transmitter 100 and any of the plurality of the wireless power receivers 110-1, 110-2, . . . , 110-$n$ may be within less than 30 meters. Alternatively, if an electromagnetic induction method is adopted by the wireless power transmitter 100, a distance between the wireless power transmitter 100 and any of the plurality of the wireless power receivers 110-1, 110-2, . . . , 110-$n$ may be within less than 10 cm.

At least one of the wireless power receivers 110-1, 110-2, . . . , 110-$n$ may charge a battery therein by receiving wireless power from the wireless power transmitter 100. Moreover, at least one of the wireless power receivers 110-1, 110-2, . . . , 110-$n$ may transmit, to the wireless power transmitter 100, a signal to request wireless power transmission, information to be used for wireless power reception, status information of the wireless power receiver, or control information to control the wireless power transmitter 100, which will be described later in detail.

Furthermore, at least one of wireless power receivers 110-1, 110-2, . . . , 110-*n* may transmit a respective message indicating a respective charging status to the wireless power transmitter 100.

The wireless power transmitter 100 may include a display means, such as a display unit, displaying the respective status of the wireless power receivers 110-1, 110-2, . . . , 110-*n* based on the respective messages received from the wireless power receivers 110-1, 110-2, . . . , 110-*n*. The wireless power transmitter 100 may also display estimated time for completion of charging the respective wireless power receivers 110-1, 110-2, 110-*n*.

The wireless power transmitter 100 may also transmit a control signal (or control message) to each wireless power receiver 110-1, 110-2, . . . , 110-*n* to disable its wireless charging function. Upon receiving the control signal to disable the wireless charging function from the wireless power transmitter 100, the wireless power receiver may disable its wireless charging function.

Figure 2A:
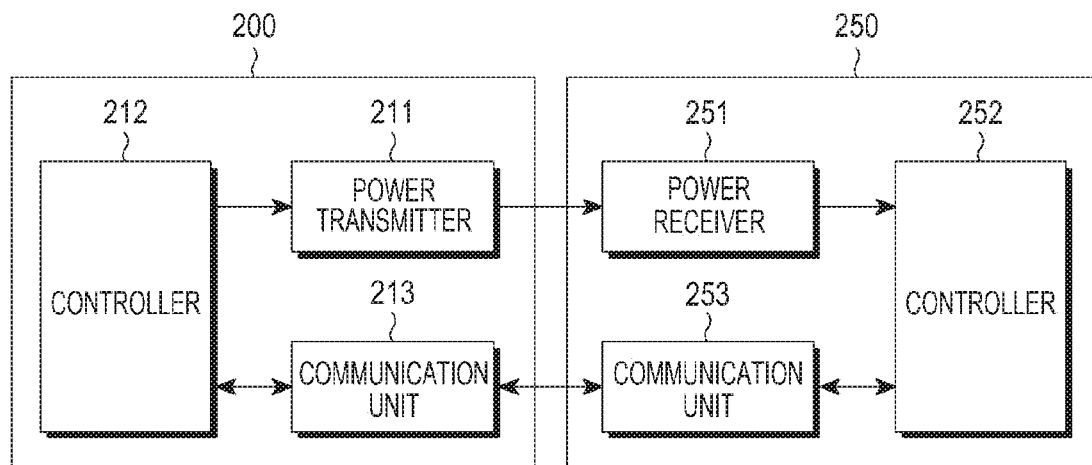
FIG. 2A is a block diagram illustrating a wireless power transmitter and a wireless power receiver according to an embodiment of the present invention.

FIG. 2A is a block diagram illustrating a wireless power transmitter and a wireless power receiver according to an embodiment of the present invention.

Referring to FIG. 2A, the wireless power transmitter 200 may include a power transmitter 211, a controller 212, and a communication unit 213. The wireless power receiver 250 may include a power receiver 251, a controller 252, and a communication unit 253.

The power transmitter 211 may provide power requested by the wireless power transmitter 200, and wirelessly transmit power to the wireless power receiver 250. Here, the power transmitter 211 may supply power in an Alternate Current (AC) waveform, or may convert power in a Direct Current (DC) form into an AC waveform for supply through an inverter. The power transmitter 211 may also be implemented as a built-in battery or as a power receiving interface for receiving external power and supplying the power to other components in the wireless power transmitter 200. People with ordinary skill in the art may readily understand that the power transmitter 211 is not limited to what was described above but may be implemented with any means that may provide AC power.

In addition, the power transmitter 211 may transmit the AC power through electromagnetic waves to the wireless power receiver 250. The power transmitter 211 may further include a loop coil to transmit or receive certain electromagnetic waves. In the power transmitter 211, the loop coil's inductance L may vary. People with ordinary skill in the art may readily understand that the wireless transmitter 211 may be implemented with any means that may transmit or receive electromagnetic waves.

The controller 212 may control general operations of the wireless power transmitter 200. The controller 212 may control the general operations of the wireless power transmitter 200 by means of control algorithms, programs, or applications read from a storage. The controller 212 may be implemented with a Central Processing Unit (CPU), microprocessor, or mini-computer. Detailed operation of the controller 212 will be described later.

The communication unit 213 may communicate with the wireless power receiver 250 in a predetermined communication method. The communication unit 213 may communicate with the communication unit 253 in the wireless power receiver 250 based on Near Field Communication (NFC), Zigbee communication, infrared communication, ultraviolet communication, Bluetooth communication, Bluetooth Low Energy (BLE), or the like. In the embodiment of the present invention, the communication unit 213 may use the IEEE 802.15.4 Zigbee communication or BLE method. Moreover, the communication unit 213 may use the CSMA/CA algorithm. Configuration of selecting a frequency and a channel for use in the communication unit 213 will be discussed later in detail. The aforementioned communication methods used by the communication unit 213 are just examples and are not limited thereto.

The communication unit 213 may transmit a signal of information of the wireless power transmitter 200. Here, the communication unit 213 may unicast, multicast, or broadcast the signal. Table 1 illustrates a data structure of a signal transmitted from the wireless power transmitter 200. The wireless power transmitter 200 may transmit a signal having the following frame in every predetermined cycle. Here, the signal is dubbed a Notice signal.

TABLE 1

| frame type | protocol version | sequence number | network ID | RX to Report (schedule mask) | Reserved | Number of Rx |
|---|---|---|---|---|---|---|
| Notice | 4 bit | 1 Byte | 1 Byte | 1 Byte | 5 bit | 3 bit |

Frame Type indicates a type of the signal, which is 'Notice signal' in Table 1. Protocol Version indicates a type of a protocol of the communication method, which may be assigned, e.g., 4 bits. Sequence Number indicates a sequential order of the corresponding signal, which may be assigned, e.g., 1 byte. For example, Sequence Number may be incremented by 1 for each signal transmission or reception. Network ID indicates a network identifier of the wireless power transmitter 200, which may be assigned, e.g., 1 byte. Rx to Report (schedule mask) indicates which wireless power receiver does a report to the wireless power transmitter 200, which may be assigned, e.g., 1 byte. Table 2 illustrates the Rx to Report (schedule mask) according to an embodiment of the present invention.

TABLE 2

| Rx to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

Rx1 through Rx8 may correspond to wireless power receivers 1 through 8, respectively. In the Rx to Report (schedule mask) illustrated in Table 2, a wireless power receiver corresponding to '1' may be intended to do the report.

Reserved is a field reserved for later use, which may be assigned, e.g., 5 bytes. Number of Rx indicates the number of wireless power receivers around the wireless power transmitter 200, which may be assigned, e.g., 3 bits.

The signal in the frame of Table 1 may be implemented in a form to be assigned to WPT of IEEE 802.15.4 data structure. Table 3 illustrates the IEEE 802.15.4 data structure.

TABLE 3

| Preamble | SFD | Frame Length | WPT | CRC16 |
|---|---|---|---|---|

Referring to Table 3, the IEEE 802.15.4 data structure may include Preamble, SFD, Frame Length, WPT, and CRC16 fields, and the data structure of Table 1 may correspond to the WPT field.

The communication unit 213 may receive power information from the wireless power receiver 250. The power information may include at least one of capacity of the wireless power receiver 250, remaining amount of the battery, frequency of charging, battery consumption, battery capacity, and battery charge/consumption ratio. The communication unit 213 may transmit a charging function control signal to control a charging function of the wireless power receiver 250. The charge function control signal enables or disables the charging function by controlling the power receiver 251 in the wireless power receiver 250.

The communication unit 213 may receive signals not only from the wireless power receiver 250 but also from other wireless power transmitters. For example, the communication unit 213 may receive from the other wireless power transmitter a Notice signal having the frame of Table 1.

In FIG. 2A, the wireless power transmitter 200 includes the power transmitter 211 and the communication unit 213 separately and uses out-band communications, but is not limited thereto. The power transmitter 211 and the communication unit 213 may be integrated in a single hardware device, and thus the wireless power transmitter 200 may use in-band communications.

The wireless power transmitter 200 and the wireless power receiver 250 may communicate various signals with each other, and accordingly, subscription of the wireless power receiver 250 to a wireless power network hosted by the wireless power transmitter 200 and charging through wireless power transmission and reception may be performed, which will be described later in detail.

Figure 2B:
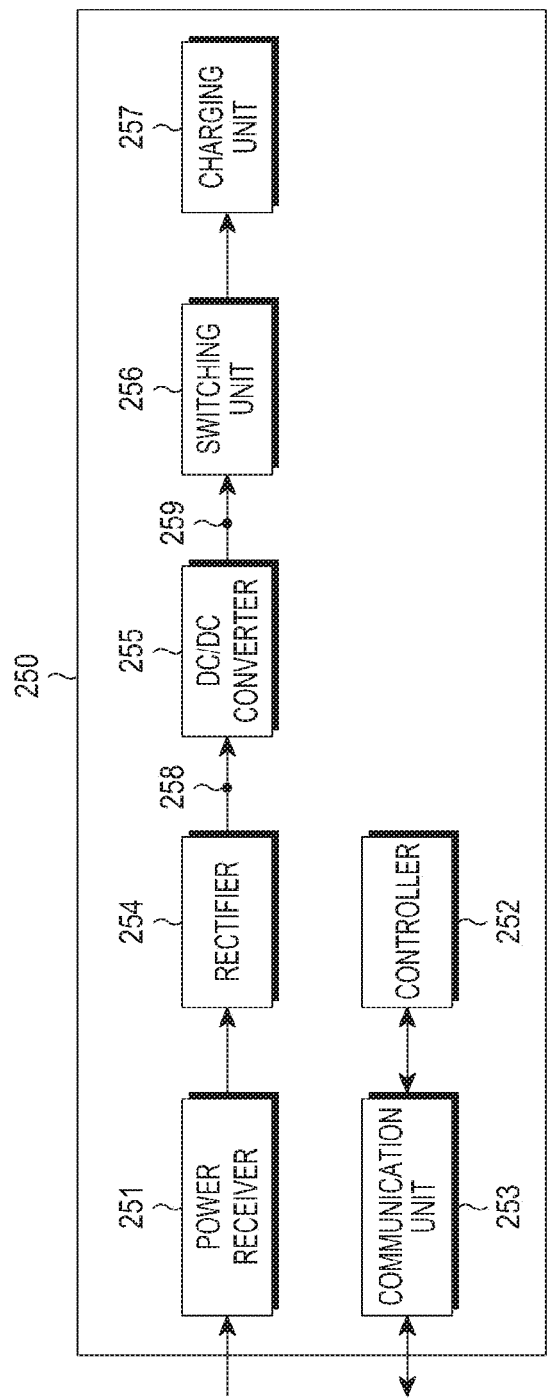
FIG. 2B is a block diagram illustrating a wireless power receiver according to an embodiment of the present invention.

FIG. 2B is a block diagram illustrating a wireless power receiver according to an embodiment of the present invention.

Referring to FIG. 2B, the wireless power receiver 250 may include a power receiver 251, a controller 252, a communication unit 253, a rectifier 254, a DC-to-DC converter 255, a switching unit 256, and a charging unit 257.

Description of the power receiver 251, controller 252 and communication unit 253 will be omitted herein. The rectifier 254 may rectify wireless power received by the power receiver 251 into a DC form and be implemented with e.g., bridge diodes. The DC-to-DC converter 255 may convert the rectified power with a predetermined gain. For example, the DC-to-DC converter 255 may convert the rectified power to 5 V at its output end 259. Alternatively, lowest and highest voltages to be applied to the front end (input end) of the DC-to-DC converter 255 may be preset, which may be written in Input Voltage MIN and Input Voltage MAX fields of a Request Join signal, respectively, which will be discussed later in detail. Rated voltage and rated current at the output end 259 of the DC-to-DC converter 255 may also be written in Typical Output Voltage and Typical Output Current fields of the Request join signal, respectively.

The switching unit 256 may connect the DC-to-DC converter 255 to the charging unit 257. The switching unit 256 may be in an on or off state under control of the controller 252. The charging unit 257 may store the power converted by the DC-to-DC converter 255 when the switching unit 256 is in the on state.

Figure 3A:
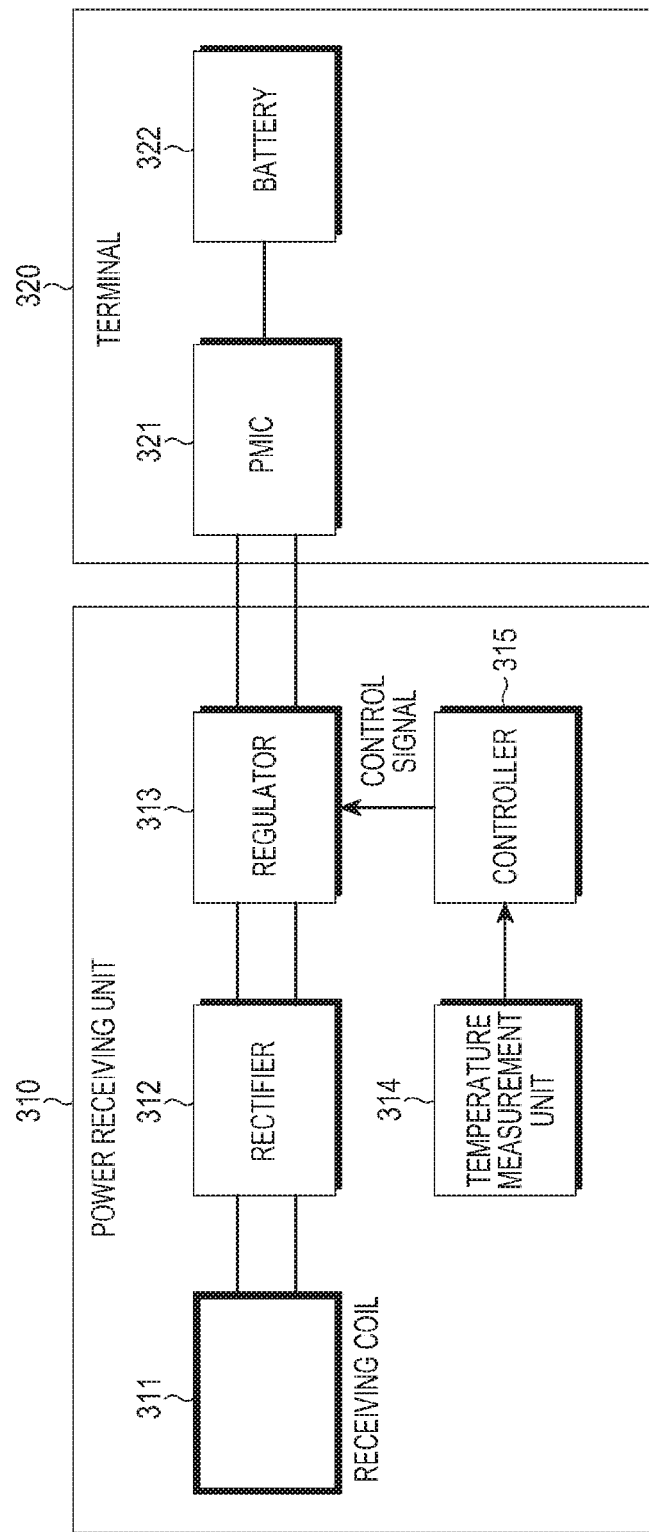
FIGS. 3A and 3B are block diagrams illustrating wireless power receivers according to various embodiments of the present invention.

FIG. 3A is a block diagram illustrating a wireless power receiver according to an embodiment of the present invention. Referring to FIG. 3A, the wireless power receiver may include a power receiving unit 310 and a terminal 320. The power receiving unit 310 may include a receiving coil 311, a rectifier 312, a regulator 313, a temperature measurement unit 314, and a controller 315. The terminal 320 may include a Power Management Integrated Chip (PMIC) 321 and a battery 322. While it is assumed that a charger IC and Micro Control Unit (MCU) are integrated together in the PMIC 321 in FIG. 3A, the charger IC may be implemented separately from the PMIC in another embodiment.

The receiving coil 311 is responsible for receiving wireless power from a wireless power transmitter. Wireless power in an AC form may be outputted to the rectifier 312 from the receiving coil 311.

The rectifier 312 may convert the wireless power in the AC form into a DC form. The regulator 313 may regulate the wireless power in the DC form to a certain level. The regulator 313 may be configured with, e.g., a DC-to-DC converter, regulating the wireless power to have a regulated current level. An input end of the regulator 313 may be connected to an output end of the rectifier 312, and an output end of the regulator 313 may be connected to an input end of the PMIC 321 in the terminal 320. The regulator 313 may also receive from the controller 315 a control signal for current level regulation, as illustrated in FIG. 3A. In other words, a current outputted from the regulator 313 may be regulated based on the control signal.

The temperature measurement unit 314 may start measuring temperature of the wireless power receiver in response to power transmission to the wireless power receiver. The temperature measurement may be performed at a predetermined first interval or non-periodically. Here, a predetermined first interval refers to a predetermined interval with a first value for distinguishing the predetermined interval with other values. The temperature measurement unit 314 may measure a temperature of a point in the wireless power receiver. For example, it may measure a temperature of at least one of the receiving coil 311, the rectifier 312, the regulator 313, the PMIC 321, and the battery 322.

The controller 315 may control general operations of the power receiving unit 310. The controller 315 may also manage respective temperature information of components of the power receiving unit 310, which is inputted from the temperature measurement unit 314. As to the current level regulation, the controller 315 may regulate a current level outputted from the regulator 313 within a threshold. In an embodiment of the present invention the controller 315 may monitor a temperature at a point inside of the wireless power receiver through the temperature measurement unit 314, and may control the wireless power receiver to be charged with a regulated charging power if the monitored temperature exceeds a preset temperature. In an embodiment of the present invention, the controller 315 may control the current flowing through either the regulator 313 or PMIC 321 to be decreased. The controller 315 may regulate the charging power by providing a control signal to the regulator 313 to decrease the current outputted from the regulator 313 to the PMIC 321, or alternatively, by providing a control signal to the PMIC 321 to decrease charging current from the PMIC 321 to the battery 322.

For example, if a temperature of the rectifier 312 exceeds the preset temperature, the controller 315 may provide a control signal to the regulator 313 to decrease output current of the regulator 313. In other words, the controller 315 may provide a control signal to the regulator 313 to decrease the charging current. The preset temperature is a reference temperature set below an Over Temperature Protection (OTP) temperature that indicates an abnormal charging state, such as overheating state.

The controller 315 may determine whether a temperature measured by the temperature measurement unit 314 is higher than the preset temperature. If the measured temperature is higher than the preset temperature, it indicates that the wireless power receiver is being overheated due to wireless charging and the charging status of the wireless power receiver may need to be carefully monitored.

For example, if the measured temperature is higher than the preset temperature, the controller 315 may provide a control signal to the regulator 313 to decrease the present current level to a predetermined level. Alternatively, the controller 315 may divide a range between the preset temperature and the OTP temperature into several sub-ranges, and may provide a control signal to the regulator 313 depending on what sub-range the measured temperature belongs to. A control signal for temperature adjustment may be determined by referring to a predetermined mapping table that shows relationships between measured temperatures and currents to be regulated. Accordingly, the controller 315 may determine how and how much the temperature will be adjusted by referring to the mapping table. Alternatively, if the measured temperature is above the preset temperature, temperature measurement may be performed at a predetermined second interval. The predetermined second interval may be shorter than the predetermined first interval. Here, the predetermined first and second interval refers to the predetermined interval having a first and second value.

If a control signal for current level regulation is provided to decrease an output current of the regulator 313, a current passing through the PMIC 321 may also be decreased, thus eventually, temperature rise is prevented. The controller 315 may continually monitor temperature even after providing the control signal to decrease the output current. If a measured temperature goes below the preset temperature, the controller 315 may provide a control signal to increase the output current. On the other hand, if a measured temperature exceeds the preset temperature, the controller 315 may provide a control signal to decrease the output current. If a measured temperature is above both the preset temperature and OTP temperature, it means that the wireless power receiver may be possibly damaged by overheating. Thus, to protect the wireless power receiver from being damaged, the controller 315 may control a load switch to be off.

The PMIC 321 may manage the power received wirelessly or via cable, and the power applied to respective components of the wireless power receiver. The PMIC 321 may control charging by regulating the power provided to the battery 322 for charging.

Figure 3B:
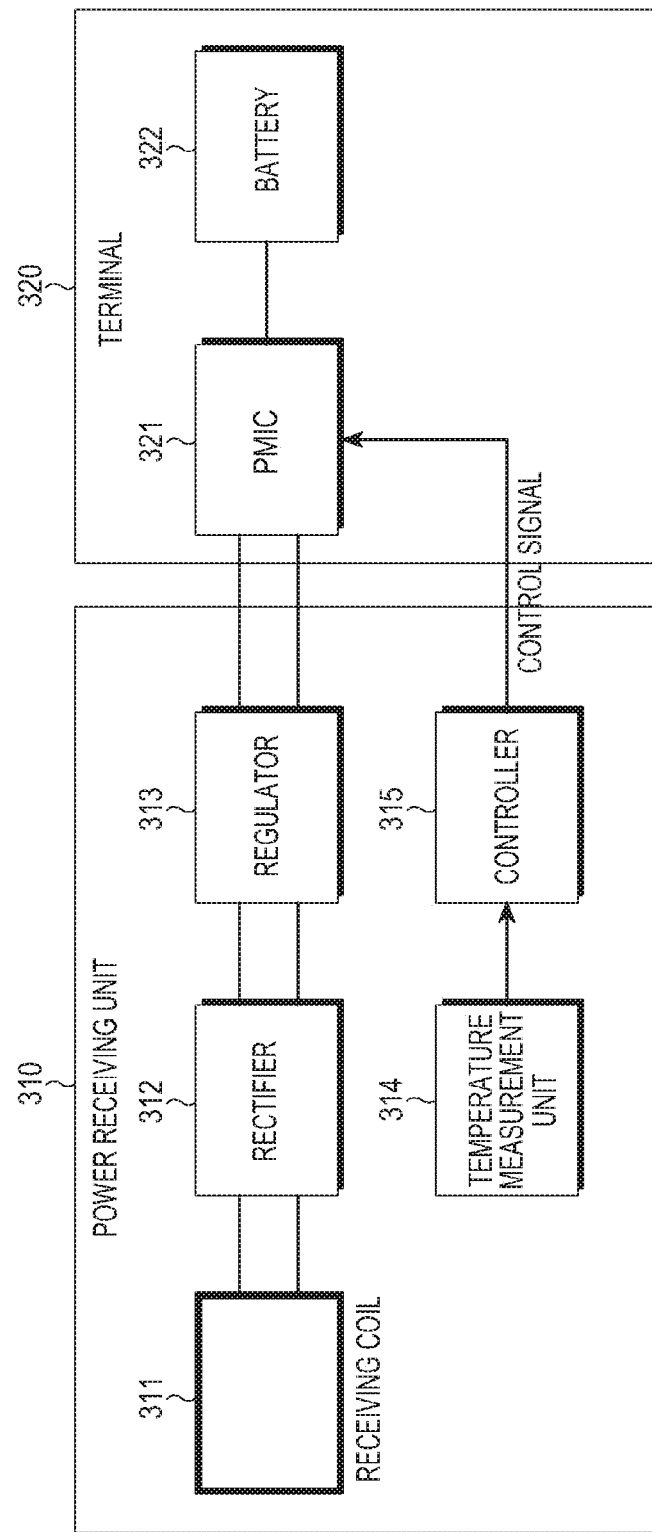

FIG. 3B is a block diagram illustrating a wireless power receiver according to another embodiment of the present invention. In contrast to FIG. 3A where the controller 315 regulates the output current of the regulator 313, FIG. 3B illustrates that the controller 315 may regulate an output current of the PMIC 321. For example, the controller 315 may decrease the output current of the PMIC 321 if a measured temperature exceeds the preset temperature. In such a way, the controller 315 may decrease charging current flowing to the battery 322, therefore, temperature rise in the wireless power receiver is prevented. Regulation of an output current of the battery 322 may also be interpreted as regulating output power. In other words, for a constant voltage type battery, current regulation leads to changes in power, so regulating output current may lead to regulating output power.

The controller 315 may increase an output current of the PMIC 321 if a measured temperature drops below the preset temperature. While some examples of decreasing charging current or output current of the regulator 313 have been described, voltage may be decreased to a predetermined voltage level in other examples.

Figure 4:
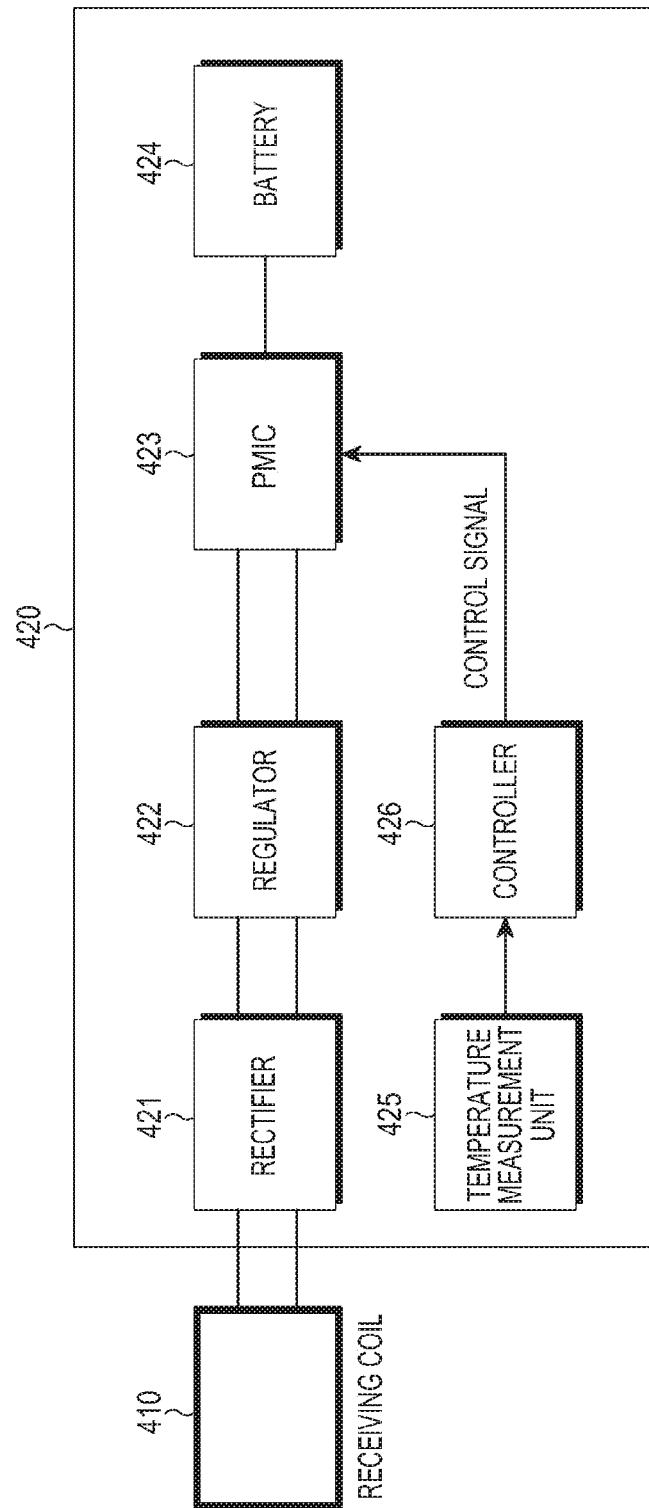
FIG. 4 is a block diagram illustrating a wireless power receiver according to another embodiment of the present invention.

FIG. 4 is a block diagram illustrating a wireless power receiver, according to another embodiment of the present invention. Referring to FIG. 4, the wireless power receiver may include a receiving coil 410 and a terminal 420. The terminal 420 may include a rectifier 421, a regulator 422, a PMIC 423, a battery 424, a temperature measurement unit 425, and a controller 426. In contrast to the wireless power receiver illustrated in FIG. 3B, in the wireless power receiver illustrated in FIG. 4, the terminal 420 may include the rectifier 421, the regulator 422, the temperature measurement unit 425, and the controller 426. The rectifier 421, the regulator 422, the temperature measurement unit 425, and the controller 426 may be contained independently of the receiving coil 410. Operations of the receiving coil 410, the rectifier 421, the regulator 422, the PMIC 423, the battery 424, and the temperature measurement unit 425 are the same as or very similar to those of FIG. 3B.

The PMIC 423 may convert a voltage of the regulated output power to another voltage to be applied to other components of the terminal 420. For example, if the voltage of the regulated output power is 25V and an input voltage of the battery 424 is 5V, the PMIC 423 may perform DC-to-DC converting from 25V to 5V.

The battery 424 may be charged with wireless power using the converted voltage. The temperature measurement unit 425 may measure a temperature of a component, such as the rectifier 421, the regulator 422, the PMIC 423, the battery 424, etc., and provide the measurement result (i.e., measured temperature) to the controller 426.

The controller 426 may control general operations of the terminal 420. In particular, the controller 426 may decrease output power of the PMIC 423 based on the measured temperature of a component of the terminal 420. For example, the controller 426 may decrease output power of the PMIC 423 if the measured temperature exceeds the preset temperature. The controller 426 may increase output power of the PMIC 423 again if a measured temperature drops below the preset temperature.

Figure 5:
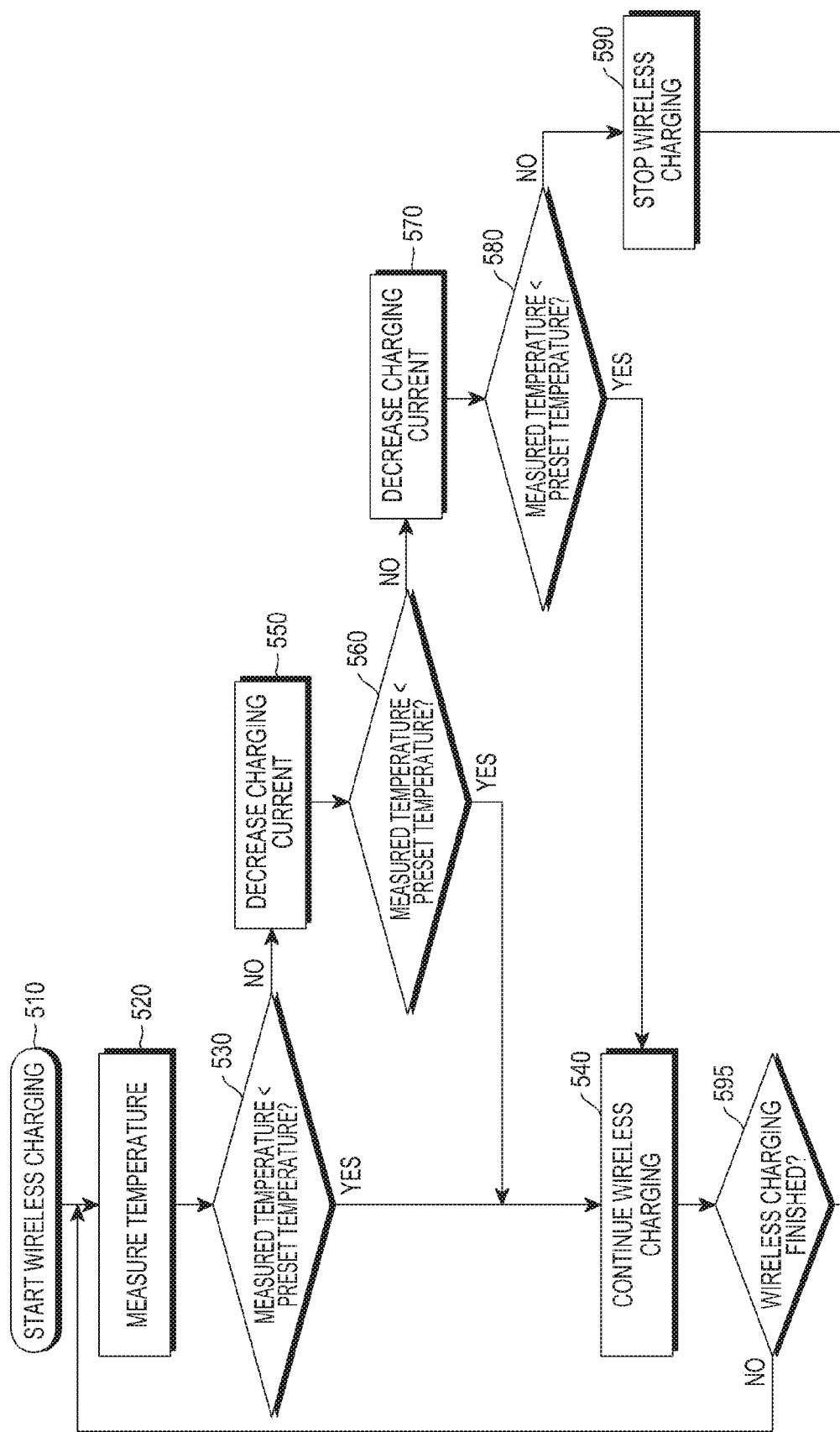
FIGS. 5 and 6 are flowcharts illustrating a method of controlling a wireless power receiver according to various embodiments of the present invention.

FIG. 5 is flowchart illustrating a method of controlling a wireless power receiver according to an embodiment of the present invention.

In step 510, the wireless power receiver may start wireless charging while receiving wireless power from a wireless power transmitter. In step 520, a temperature measurement unit in the wireless power receiver may measure a temperature of a point in the wireless power receiver. The wireless power receiver may keep monitoring temperature of the wireless power receiver. If a measured temperature is lower than the preset temperature in step 530, the wireless power receiver may continue wireless charging in step 540. Otherwise, if the measured temperature is higher than the preset temperature in step 530, the wireless power receiver may decrease charging current in step 550. For example, the wireless power receiver may decrease charging current of at least one component included in the wireless power receiver.

In step 560, the wireless power receiver may determine again whether a measured temperature is lower than the preset temperature. If the measured temperature is lower than the preset temperature in step 560, the wireless power receiver may continue wireless charging. Otherwise, if the measured temperature is higher than the preset temperature in step 560, the wireless power receiver may decrease charging current in step 570. In step 580, the wireless power receiver may determine again whether a measured temperature is lower than the preset temperature. If the measured temperature is lower than the preset temperature, the wireless power receiver may continue wireless charging. The wireless power receiver illustrated in FIG. 5 may decrease a current value applied to the wireless power receiver. If the measured temperature is higher than the preset temperature, i.e., if a temperature measured after a predetermined interval is still higher than the preset temperature, in step 590, the wireless power receiver may determine that temperature has not yet been recovered to normal and may stop wireless charging.

Figure 6:
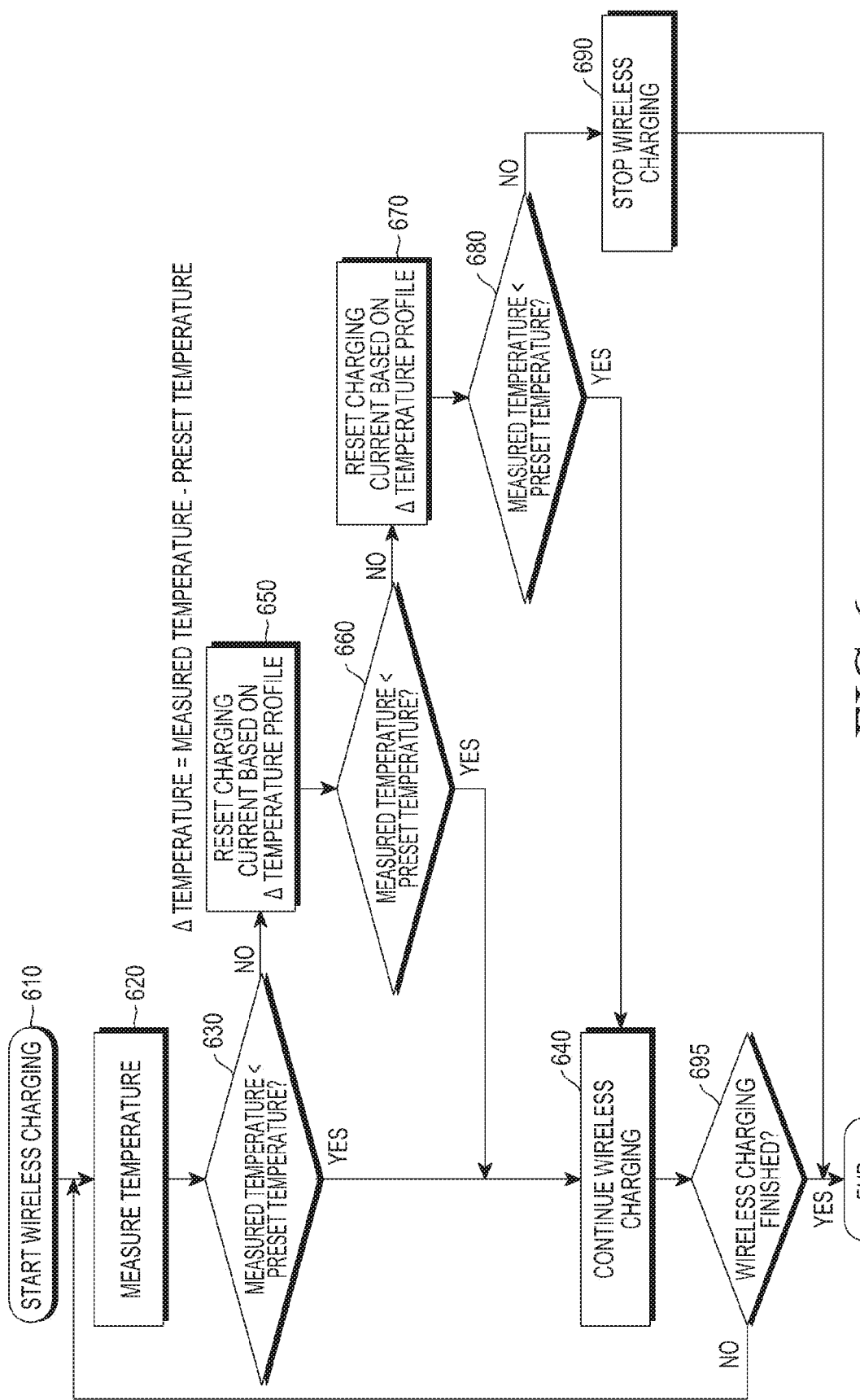

FIG. 6 is flowchart illustrating a method of controlling a wireless power receiver according to an embodiment of the present invention.

In step 610, the wireless power receiver may start wireless charging while receiving wireless power from a wireless power transmitter. In step 620, a temperature measurement unit in the wireless power receiver may measure a temperature of a point in the wireless power receiver. The wireless power receiver may keep monitoring temperature of the wireless power receiver. If a measured temperature is lower than the preset temperature in step 630, the wireless power receiver may continue wireless charging in step 640. Otherwise, if the measured temperature is higher than the preset temperature in step 630, the wireless power receiver may re-set charging current based on a temperature difference (Atemperature). The temperature difference may be a difference between a measured temperature and the preset temperature. The wireless power receiver may pre-store information regarding relationships between temperature differences and charging currents to be re-set. The wireless power receiver may read out the information if a measured temperature is lower than the preset temperature and re-set charging current based on the information. For example, the wireless power receiver may re-set charging power to be decreased.

In step 660, the wireless power receiver may compare again a measured temperature with the preset temperature. If the measured temperature is lower than the preset temperature in step 660, the wireless power receiver may continue wireless charging with the re-set current in step 640. In other words, if a measured temperature after charging current is regulated drops below the preset temperature, the wireless power receiver may regulate charging current to be increased so that charging current may be recovered to the level where the measured temperature does not exceed the preset temperature. Otherwise, if the measured temperature is higher than the preset temperature in step 660, the wireless power receiver may re-set the charging current in step 670. In step 680, the wireless power receiver may compare again a measured temperature with the preset temperature. If the measured temperature is lower than the preset temperature in step 680, the wireless power receiver may continue wireless charging with the re-set current in step 640. If the measured temperature is higher than the preset temperature, i.e., if a temperature measured after a predetermined interval is still greater than the preset temperature, in step 690, the wireless power receiver may determine that temperature has not yet been recovered to normal and may stop wireless charging.

According to various embodiments of the present invention, a wireless power receiver may prevent temperature rise by decreasing the current as the temperature rises above a preset temperature.

Several embodiments have been described in connection with, e.g., mobile communication terminals, but a person of ordinary skill in the art will understand and appreciate that various modifications can be made without departing the scope of the present invention. Thus, it will be apparent to those ordinary skilled in the art that the present invention is not limited to the embodiments described above, which have been provided only for illustrative purposes.

What is claimed is:

1. An electronic device including a wireless power receiver, the electronic device comprising:
   power receiving circuitry configured to wirelessly receive power from a wireless power transmitter;
   power converting circuitry configured to convert the received power in an alternating current (AC) form into a direct current (DC) form;
   power management circuitry configured to provide the converted power to a battery of the electronic device;
   a temperature measurement unit configured to measure a temperature of a point in the electronic device;
   a communication unit; and
   a controller configured to:
      control the power management circuitry to maintain an amount of the converted power at a first level if the temperature measured by the temperature measurement unit is lower than a preset temperature,
      control the power management circuitry to decrease the amount of the converted power to a second level, which is lower than the first level, if the amount of the converted power is at the first level and the temperature measured by the temperature measurement unit is greater than or equal to the preset temperature, and maintain the amount of the converted power at the second level until the temperature measured by the temperature measurement unit is lower than the preset temperature,
      control the power management circuitry to increase the amount of the converted power to the first level if the amount of the converted power is at the second level and the temperature measured by the temperature measurement unit is lower than the preset temperature, and
      control the communication unit to transmit, to the wireless power transmitter, a signal including status information of the electronic device and control information to control the wireless power transmitter.

2. The electronic device of claim 1, wherein the point in the wireless power receiver includes at least one component of the wireless power receiver.

3. The electronic device of claim 1, wherein the power receiving circuitry comprises a coil and a capacitor.

4. The electronic device of claim 1, wherein the temperature measurement unit is further configured to measure a temperature of at least one of the power receiving circuitry, the power converting circuitry, and the battery.

5. The electronic device of claim 1, wherein the controller is further configured to:
   monitor the temperature of the point in the wireless power receiver by the temperature measurement unit, if the temperature measured by the temperature measurement unit is greater than or equal to the preset temperature, and repeatedly perform a comparison of the temperature measured by the temperature measurement unit with the preset temperature.

6. The electronic device of claim 5, wherein the controller is further configured to control the power management circuitry to decrease the amount of the converted power, if the measured temperature is greater than or equal to the preset temperature.

7. The electronic device of claim 1, wherein the controller is further configured to stop providing the converted power to the battery, if the temperature measured by the temperature measurement unit is greater than or equal to an over temperature protection (OTP) temperature.

8. A method of a wireless power receiver, the method comprising:

wirelessly receiving power from a wireless power transmitter;

converting the power in an alternating current (AC) form into a direct current (DC) form;

providing the converted power to a battery of the electronic device;

measuring a temperature of a point in the wireless power receiver while receiving the power;

maintaining an amount of the converted power at a first level if the temperature is lower than a preset temperature;

decreasing the amount of the converted power to a second level, which is lower than the first level, if the amount of the converted power is at the first level and the temperature is greater than or equal to the preset temperature, and maintaining the amount of the converted power at the second level until the temperature is lower than the preset temperature;

increasing the amount of the converted power to the first level if the amount of the converted power is at the second level and the temperature is lower than the preset temperature; and transmitting, to the wireless power transmitter, a signal including status information of the wireless power receiver device and control information to control the wireless power transmitter.

9. The method of claim 8, wherein decreasing the amount of the converted power comprises decreasing an output current to the battery.

10. The method of claim 8, wherein the point in the wireless power receiver includes at least one component of the wireless power receiver.

11. The method of claim 8, further comprising:

monitoring the temperature of the point in the wireless power receiver, if the temperature is greater than or equal to the preset temperature; and repeatedly performing a comparison of the temperature with the preset temperature.

12. The method of claim 11, further comprising decreasing the amount of the converted power, if the temperature is greater than or equal to the preset temperature.

13. The method of claim 8, further comprising stopping providing the converted power to the battery, if the temperature is greater than or equal to an over temperature protection (OTP ) temperature.

* * * * *